Oct. 22, 1940.　　　　E. L. BAUER　　　　2,218,737

PISTON SKIRT EXPANDER

Filed April 3, 1939

INVENTOR.
Edward L. Bauer
BY Earl D. Chappell
ATTORNEYS

Patented Oct. 22, 1940

2,218,737

UNITED STATES PATENT OFFICE 2,218,737

PISTON SKIRT EXPANDER

Edward L. Bauer, Hastings, Mich., assignor to Hastings Manufacturing Company, Hastings, Mich.

Application April 1, 1939, Serial No. 265,704

10 Claims. (Cl. 309—12)

This invention relates to piston skirt expanders.

The main objects of my invention are:

First, to provide a piston skirt expander characterized by a very effective resilient expanding action.

Second, to provide an expander of the type described in the form of a composite two-part element the parts of which cooperate in a novel manner to develop and apply the expanding effect of both elements.

Third, to provide an expander of the type described in the form of an element imparting a predetermined spring expansive action to a piston skirt by its own inherent resiliency and means for supplementing said action.

Further objects relating to details and economies of my invention will definitely appear from the description to follow. The invention is defined in the claims.

A structure embodying the features of my invention is illustrated in the accompanying drawing, wherein.

Figure 1:
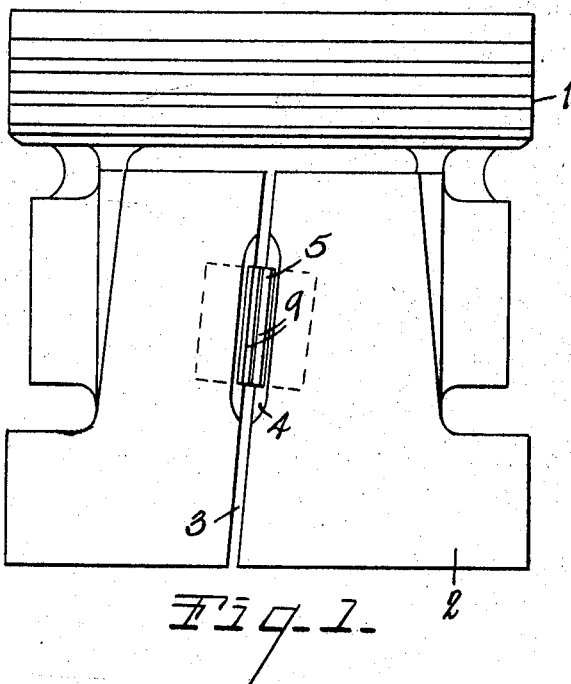
Fig. 1 is a view in elevation of a piston having an expander of my invention inserted therein in operative position.

The present invention relates to an expander adapted to be inserted in the slot in a piston skirt and by the expansive action thereof to spread or expand the skirt and thereby eliminate undesirable looseness of the piston in a cylinder.

The invention consists in the provision of an element having a pair of spring expander jaw carrying arms adapted to be engaged in the piston slot to expand the skirt circumferentially and means in the form of a further element rigidly secured to the first element and likewise having a pair of arms, said last named arms being engaged by the arms of the first named element with a deflecting action, thereby supplementing the circumferential expanding action of the first named arms by a further radial thrust supplied by the last named arms.

Referring to the drawing, the reference numeral 1 in general indicates a piston having a skirt 2 provided with the usual slot 3. This slot is milled to provide seats 4 for the expander, which is generally indicated by the reference numeral 5.

Figure 2:
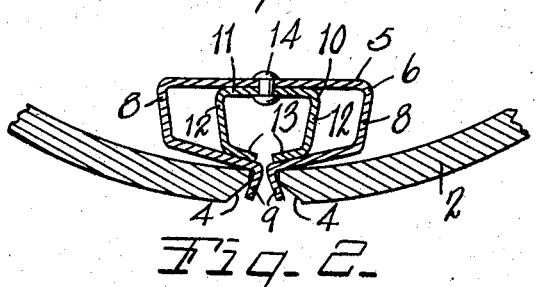
Fig. 2 is an enlarged fragmentary view in horizontal section illustrating the details of my expander construction.
Figure 3:
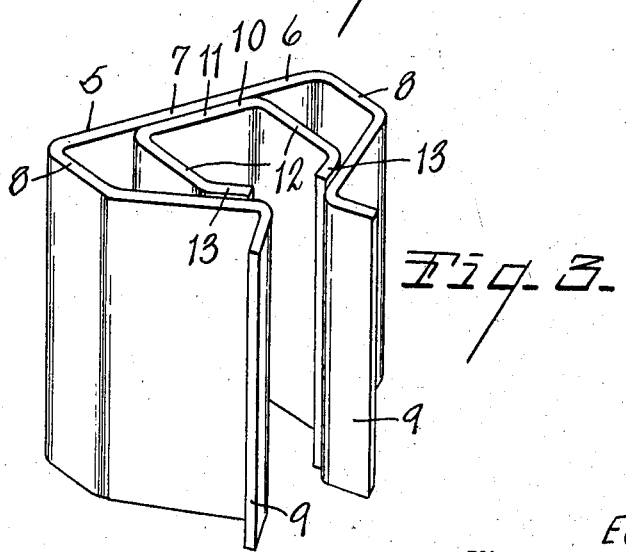
Fig. 3 is a perspective view illustrating the expander in normal relaxed condition.

Details of construction of the expander are illustrated clearly in Figs. 2 and 3 and consist of an outer loop or bight-shaped element 6 having a flat or substantially flat base or transverse portion 7 integrally connecting a pair of spring arms 8. The element 6 is made of a suitable spring steel. The arms 8 terminate in oppositely facing out-turned jaws 9 which are adapted to be engaged in seats 4 as illustrated in Figs. 1 and 2. By the construction above described, an expander element is provided which, due to its own characteristics, possesses a considerable expansive action tending to spread the skirt in a circumferential direction. However, I have found that in order to produce an efficient or a sufficiently strong expander with merely a pair of skirt engaging arms, it must be made of such size and weight of material as to be objectionable or even impossible of use, because of the fact that it increases the weight and cost of the element and, in addition, is likely to interfere with the throw of the connecting rod within the skirt.

It is therefore an object of the present invention to provide an expander having the desired expansive force and at the same time being compact, light in weight, economical to produce, and easy to install. To this end I provide a second resilient element, generally indicated 10, which is somewhat similar in shape to the element 6 in that it has a base 11 parallel to the base 7 and a pair of arms 12 integrally connected to the base. These arms terminate in inturned end portions 13 which are normally spaced from jaws 9, see Fig. 3, but which are engaged by the said jaws when the latter are compressed and inserted in the operative position in slot 3, see Fig. 2. The element 10 is fixedly secured to element 6 by means of rivets 14 or other suitable rigid securing means.

From the foregoing remarks, it is believed that the operation of my improved expander will be clear. When the arms 8 of outer element 6 are compressed for insertion in the slot, the jaws 9 engage end portions 13 which are thereby deflected, displaced or biased inwardly, inasmuch as element 10 is likewise of spring material. During this deflection, jaws 9 slide along the portions 13. When the element 6 is released to bring jaws 9 against seats 4, as illustrated in Fig. 2, the said jaws spring outwardly partially due to their own resilience and partially due to the outward thrust and resilience of arms 12 and the tendency of the latter to react or return to unbiased condition. The jaws remain subject to this force transmitted from element 10 in operation. It will thus be perceived that the skirt 2 is subjected to a strong circumferential expansive action due to the composite thrust of the expander 5, this thrust being made up of the circumferential expansive force exerted by element 6 and the radial expansive force of element 10 which is transmitted to element 6 with a camming effect. In this manner, the skirt 2 is strongly urged to the desired snug fit within the cylinder.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A piston expander comprising a bight-shaped element of spring metal having arms terminating in out-turned jaws adapted to engage in the slot of a piston, a second bight-shaped element disposed within the first and having arms terminating in inturned ends spaced from the jaws, and means for fixedly securing said elements together, said jaws being positioned in spaced relation to said end portions in normal relaxed condition of the expander, and engaging the said end portions when the jaws are compressed for insertion in a piston slot, such engagement biasing the arms of the second element, and causing the reaction thereof to be transmitted to said jaws to supplement the expansive action of the first named element.

2. A piston expander comprising an element of spring metal having arms terminating in out-turned jaws adapted to engage in the slot of a piston, a second resilient element disposed within the first, and means for fixedly securing said elements together, said jaws being positioned in spaced relation to said second element in normal relaxed condition of the expander and engaging said second element when the jaws are compressed for insertion in the piston slot, such engagement biasing the second element, and causing the same to react thereafter to engage and supplement the expansive action of the first named element.

3. A composite piston expander comprising a pair of spring metal elements, and means for rigidly securing the same together, one of said elements having compressible converging arms terminating in out-turned jaws for operatively engaging the slot in a piston skirt and the other of said elements having portions positioned relative to said arms to be engaged and biased thereby upon compression of the same for insertion in the slot and to thereby supplement the expansive action of said arms.

4. A composite piston expander comprising a pair of spring metal elements, and means for rigidly securing the same together, one of said elements having compressible arms terminating in out-turned jaws for operatively engaging the slot in a piston skirt and the other of said elements having a portion positioned relative to said arms to be engaged thereby upon compression of the arms and in engaged position to supplement the expansive action of the jaws on the skirt.

5. An expander of the type described comprising a bight-shaped element of spring material having arms terminating in out-turned jaws adapted to engage in a slot of a piston skirt, and a resilient element within the bight of said first named element, said resilient element being engaged by said arms upon compression thereof, to insert the expander in the slot, said engagement deflecting said last named element and causing the same to supplement the expansive action of the bight-shaped element.

6. An expander of the type described comprising an element of spring material having out-turned terminal portions adapted to engage in a slot of a piston skirt, and a second element secured to said first named element and having independently movable portions adapted to be deflectingly engaged by said first named portions upon compression thereof to insert the expander in the slot, said said element thereafter reacting and supplementing the expansive action of the first named element.

7. An expander of the type described comprising a bight-shaped element of spring material having arms terminating in out-turned jaws adapted to engage in a slot of a piston skirt, and a second element within the bight of said first named element, said second element being engaged by said arms upon compression thereof to insert the expander in the slot, said engagement causing the second element to supplement the expansive action of the bight-shaped element.

8. A composite piston expander comprising a pair of coacting elements, and means for rigidly securing the same together, one of said elements being resilient and terminating in means for operatively engaging in a slot in a piston skirt and the other of said elements being positioned relative to said resilient element to be engaged and biased thereby upon compression of the same for insertion in the slot and to thereby supplement the expansive action of said resilient element.

9. A piston expander comprising an outer member having a substantially flat back portion terminating at each side in outwardly projecting converging spring arms, the arms terminating in diverging engaging jaws, and an inner member comprising a substantially flat back portion disposed centrally upon the inner side of the back portion of said outer member and fixedly secured thereto, said inner member having outwardly converging spring arms terminating in internal flange-like portions which are engaged by the converging spring arms of said outer member and subjected to biasing stress when the jaws of the outer member are engaged in a piston slot.

10. A piston expander comprising an outer member having a substantially flat back portion terminating at each side in outwardly projecting spring arms provided with out-turned piston engaging jaws, and an inner member disposed upon the inner side of the back portion of said outer member and secured thereto, said inner member having outwardly projecting spring arms which are engaged by the spring arms of said outer member and subjected to biasing stress when the jaws of the outer member are engaged in a piston slot.

EDWARD L. BAUER.